United States Patent
Depraete

(10) Patent No.: US 10,161,492 B2
(45) Date of Patent: Dec. 25, 2018

(54) HYDROKINETIC TORQUE COUPLING DEVICE FOR MOTOR VEHICLE

(71) Applicant: VALEO EMBRAYAGES, Amiens (FR)

(72) Inventor: Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 564 days.

(21) Appl. No.: 14/873,325

(22) Filed: Oct. 2, 2015

(65) Prior Publication Data

US 2017/0097077 A1    Apr. 6, 2017

(51) Int. Cl.
| | |
|---|---|
| F16H 45/02 | (2006.01) |
| F16F 15/121 | (2006.01) |
| F16F 15/129 | (2006.01) |
| F16D 3/52 | (2006.01) |
| F16F 15/133 | (2006.01) |

(52) U.S. Cl.
CPC .............. *F16H 45/02* (2013.01); *F16D 3/52* (2013.01); *F16F 15/1333* (2013.01); *F16F 2230/0064* (2013.01); *F16H 2045/0221* (2013.01); *F16H 2045/0278* (2013.01)

(58) Field of Classification Search
CPC .................................... F16H 45/02–2045/0294
See application file for complete search history.

(56) References Cited

U.S. PATENT DOCUMENTS

| | | | |
|---|---|---|---|
| 2,551,718 A | 5/1951 | Auten | |
| 4,145,936 A | 3/1979 | Vincent et al. | |
| 5,697,261 A | 12/1997 | Mokdad et al. | |
| 5,893,355 A | 4/1999 | Glover et al. | |
| 6,224,487 B1 * | 5/2001 | Yuergens | F16F 15/12366 464/68.41 |
| 8,381,888 B2 * | 2/2013 | Mueller | F16H 45/02 192/3.3 |
| 2001/0032767 A1 * | 10/2001 | Reinhart | F16F 1/34 192/3.29 |
| 2003/0106763 A1 | 6/2003 | Kimura et al. | |

(Continued)

FOREIGN PATENT DOCUMENTS

| | | |
|---|---|---|
| DE | 19729421 A1 | 1/1998 |
| DE | 19919449 A1 | 11/1999 |

(Continued)

*Primary Examiner* — Ramya P Burgess
*Assistant Examiner* — Lillian T Nguyen
(74) *Attorney, Agent, or Firm* — Berenato & White LLC

(57) ABSTRACT

A hydrokinetic torque coupling device for a motor vehicle, comprises a torque input element (11) intended to be coupled to a crankshaft (1), an impeller wheel (3) non-moveably coupled to the torque input element (11) and configured to hydrokinetically drive a turbine wheel (4), a torque output element (8) intended to be coupled to a transmission input shaft (2), a clutch (10) configured to rotationally couple the torque input element (11) and the torque output element (8) in an engaged position through a damping device (18, 22) and to rotationally uncouple the torque input element (11) and the torque output element (8) in a disengaged position. The damping device (18, 22) is configured to act against the rotation of the torque input element (11) relative to the torque output element (8), in the engaged position of the clutch (10).

20 Claims, 5 Drawing Sheets

(56) References Cited

U.S. PATENT DOCUMENTS

| | | | | |
|---|---|---|---|---|
| 2007/0163852 A1* | 7/2007 | Arhab | ................... | B23K 20/12 |
| | | | | 192/3.29 |
| 2015/0107950 A1* | 4/2015 | Mauti | ................... | F16H 45/02 |
| | | | | 192/3.28 |
| 2015/0260270 A1* | 9/2015 | Kwon | ................... | F16H 45/02 |
| | | | | 192/3.28 |
| 2015/0369296 A1 | 12/2015 | Lopez-Perez | | |

FOREIGN PATENT DOCUMENTS

| | | |
|---|---|---|
| DE | 102004024747 A1 | 12/2005 |
| EP | 1048420 A2 | 11/2000 |
| FR | 2339107 A1 | 8/1977 |
| FR | 2493446 A1 | 5/1982 |
| FR | 2499182 A1 | 8/1982 |
| FR | 2628804 A1 | 9/1989 |
| FR | 2714435 A1 | 6/1995 |
| FR | 2828543 A1 | 2/2003 |
| FR | 2938030 A1 | 5/2010 |
| FR | 3000155 A1 | 6/2014 |
| FR | 3008152 A1 | 1/2015 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | 09280317 A | 10/1997 |
| WO | WO9914114 A1 | 3/1999 |
| WO | WO2004016968 A1 | 2/2004 |
| WO | WO2011006264 A1 | 1/2011 |
| WO | WO2014128380 A1 | 8/2014 |

\* cited by examiner

HYDROKINETIC TORQUE COUPLING DEVICE FOR MOTOR VEHICLE

FIELD OF THE INVENTION

The present invention relates to a hydrokinetic torque coupling device for a motor vehicle, such as a torque converter, for instance.

BACKGROUND OF THE INVENTION

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 coupled to the transmission input shaft 2. The elastic members 7a, 7b of the first group are arranged in series through a phasing member 9, so that said elastic members 7a, 7b are deformed in phase with each other, with said phasing member 9 being movable relative to the guiding washers 6 and relative to the hub 8.

A second group of elastic members 7c is mounted with some clearance between the guiding washers 6 and the central hub 8 in parallel with the first group of elastic members 7a, 7b, with said elastic members 7c being adapted to be active on a limited angular range, more particularly at the end of the angular travel of the guiding washers 6 relative to the central hub 8. The angular travel, or the angular shift noted a, of the guiding washers 6 relative to the hub 8, is defined relative to a rest position ($\alpha=0$) wherein no torque is transmitted through the damping means formed by the above-mentioned elastic members 7a, 7b.

The torque converter further comprises clutch means 10 adapted to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping means at the end of the angular travel, i.e. for a significant a angular offset of the guiding washers 6 relative to the hub 8 (or vice versa).

It can be seen that the representation of function $M=f(\alpha)$ which defines the M torque transmitted though the device according to the a angular shift, comprises a first linear portion of slope Ka (for the low values of the a angular shift) and a second, more important, linear portion of slope Kb (for the high value of the a angular shift). Ka and Kb are the angular stiffness of the device, at the beginning and at the end of the angular travel respectively. If K1 defines the cumulated stiffness of the first springs of each pair of the first group, and K2 defines the cumulated stiffness of the second springs of each pair of the first group, and K3 defines the cumulated stiffness of the springs of the second group, then $Ka=(K1.K2)/(K1+K2)$ and $Kb=Ka+K3$.

The break of slope between the first and second portions of the curve may generate vibrations and a significant hysteresis upon operation of the torque converter which might affect the quality of filtration obtained using the damping means.

SUMMARY OF THE INVENTION

The invention more particularly aims at providing a simple, efficient and cost-effective solution to this problem.

For this purpose, it provides for a hydrokinetic torque coupling device for a motor vehicle, comprising
a torque input element intended to be coupled to a crankshaft,
a turbine wheel,
an impeller wheel rotationally coupled to the torque input element and able to hydrokinetically drive a turbine wheel,
a torque output element intended to be coupled to a transmission input shaft,
damping means,
clutch means adapted to rotationally couple the torque input element and the torque output element in an engaged position, through damping means, and able to rotationally uncouple the torque input element and the torque output element in a disengaged position, with the damping means being adapted to act against the rotation of the torque input element relative to the torque output element, in the engaged position of the clutch means, with the clutch means comprising a piston which is movable between an engaged position wherein it is rotationally coupled to the torque input element and a disengaged position wherein it is rotationally uncoupled from the torque input element, with the damping means comprising at least one elastic blade and a supporting member, with the elastic blade being rotationally linked with the piston or with the torque output element respectively and being elastically maintained supported by said supporting member, with the supporting member being carried by the torque output element or by the piston respectively, with said elastic blade being adapted to bend upon rotation of the piston relative to the torque output element.

Such damping means give a characteristic gradual curve, without any break of slope. The invention thus makes it possible to reduce the vibrations generated in operation and provides a high quality of filtration.

Besides, such a hydrokinetic torque coupling device is easy to mount and rather inexpensive.

The link between the elastic blade (or the supporting member respectively) and the piston allows an axial motion independent of the piston, It should be noted that the words "radial" and "axial" are defined with respect to the hydrokinetic torque coupling device, which is the axis of rotation of the impeller wheel or of the turbine wheel.

It should be noted that a hydrokinetic torque coupling device may be a torque converter when the hydrokinetic torque coupling means comprise an impeller wheel, a turbine wheel and a reactor, or may be a hydrokinetic coupling device when the hydrokinetic torque coupling means have no reactor.

The impeller wheel is rotationally coupled to the torque input element and able to hydrokinetically drive a turbine wheel, through a reactor.

The hydrokinetic torque coupling device may comprise an annular flange which radially extends, with the radially internal periphery of the flange being fastened to the torque output element, with the supporting element or the elastic blade respectively being mounted on the radially external periphery of the annular flange.

More particularly, the hydrokinetic torque coupling device may comprise a single flange linking the supporting member or the elastic blade respectively with the torque output element.

The elastic blade, or respectively the supporting member, may be connected to the piston through the linking member.

The torque output element comprises a central hub.

The turbine wheel and the flange may be rotationally connected to the central hub. They may be connected through the same fastening means or independently of each other.

According to one embodiment, the elastic blade may be adapted to be moved with the piston along the axis of the torque converter relative to the supporting member.

According to another embodiment, the elastic blade or the supporting member respectively may be connected to the piston through at least one member elastically deformable along the axis of the hydrokinetic torque coupling device, so as to enable the axial motion of the piston between the engaged and disengaged positions thereof.

In this case, the elastically deformable member may comprise at least one elastic blade.

The torque output element may comprise an annular rim which extends radially outwards, with the flange and the turbine wheel being fixed to said rim.

Besides, the supporting member may comprise a rolling body mounted to pivot about a shaft, with said shaft being fastened to the flange.

Besides, the hydrokinetic torque coupling device may comprise a reactor, with the impeller wheel being adapted to hydrokinetically drive the turbine wheel through the reactor. The hydrokinetic torque coupling device thus forms a torque converter.

The hydrokinetic torque coupling device may also comprise one or more of the following characteristics:
   The rolling body of the supporting member consists of a roller so mounted as to pivot about a shaft, for instance through a rolling bearing, such as a needle bearing, for instance.
   the supporting member is mounted on the radially external periphery of the external flange,
   the impeller wheel is rotationally coupled to a cover wherein the impeller wheel, the turbine wheel and/or the damping means are at least partially accommodated.
   the torque input element comprises said cover,
   the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a circumferential component which tends to move back the torque input element and the torque output element toward said relative rest position.
   the elastic blade is so designed that, in the engaged position, in a relative angular position between the torque input element and the torque output element different from a rest position, the supporting member exerts a bending stress on the elastic blade causing a cross reaction force of the elastic blade on the supporting member, with such reaction force having a radial component which tends to hold the elastic blade in contact with the supporting member,
   in the engaged position, the angular displacement of the torque input element relative to the torque output element is greater than 20° and preferably greater than 40°.
   the elastic blade comprises a fastening portion and an elastic portion comprising a radially internal strand, a radially external strand and a bowed or bent portion connecting the internal strand and the external strand.
   the damping means comprise at least two elastic leaves, with each elastic blade rotating together with the piston, or the torque output element in engaged position respectively, with each blade being associated with a supporting member rotationally linked with the torque output element in engaged position, or the piston respectively, with each blade being elastically maintained supported by said matching supporting member, with each elastic blade being adapted to bend upon rotation of the torque input element relative to the torque output element in the engaged position.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 1:
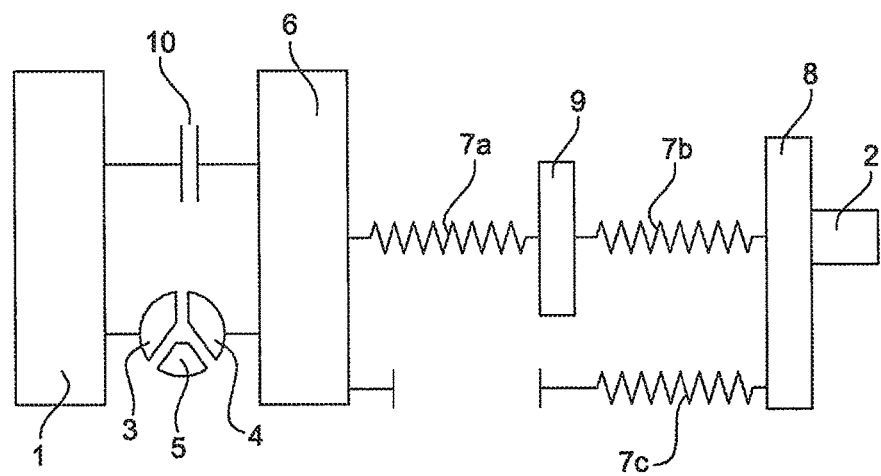
FIG. 1 is a schematic representation of a torque converter of the prior art.
Figure 2:
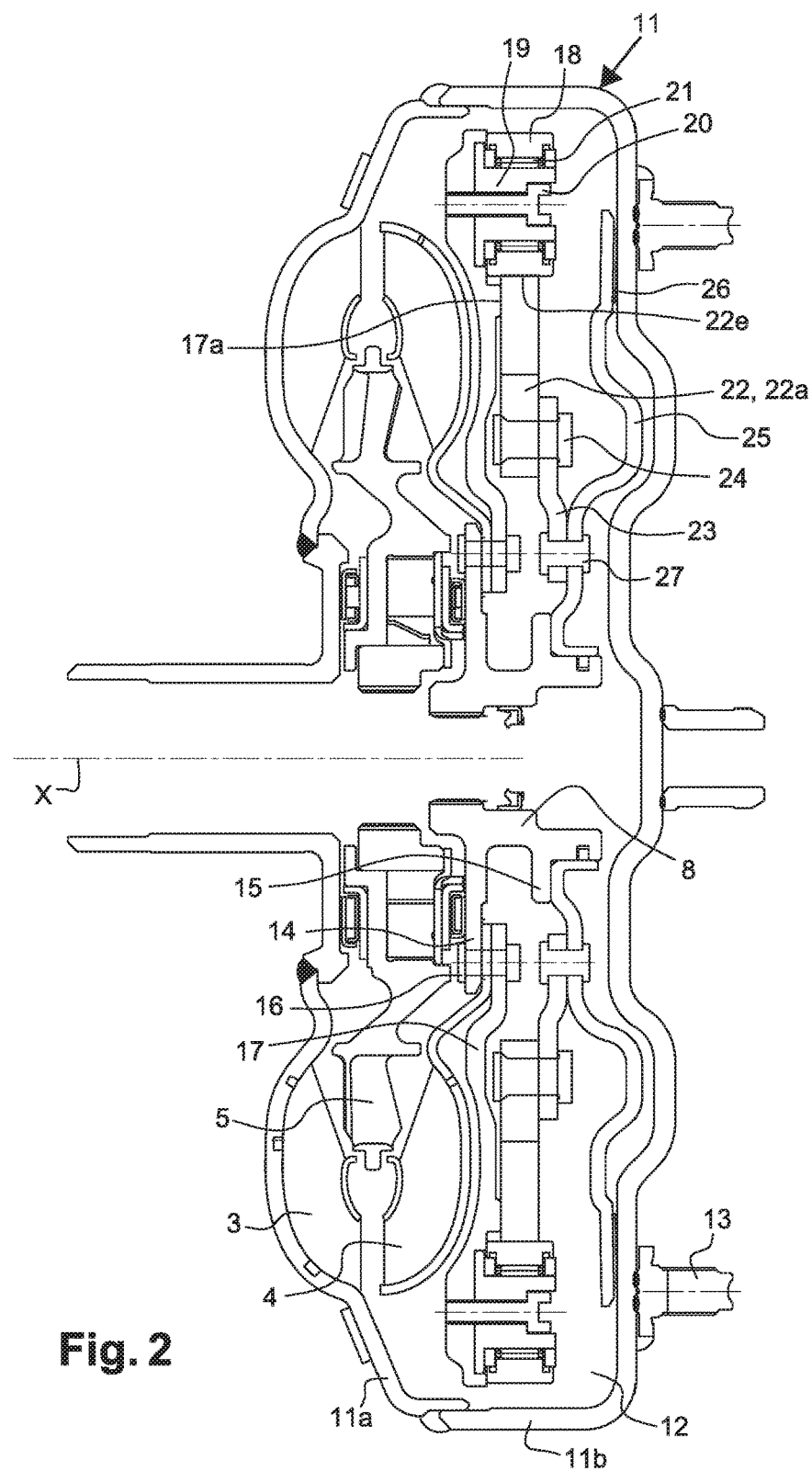
FIG. 2 is a sectional view along an axial plane, of a torque converter according to a first embodiment of the invention.
Figure 3:
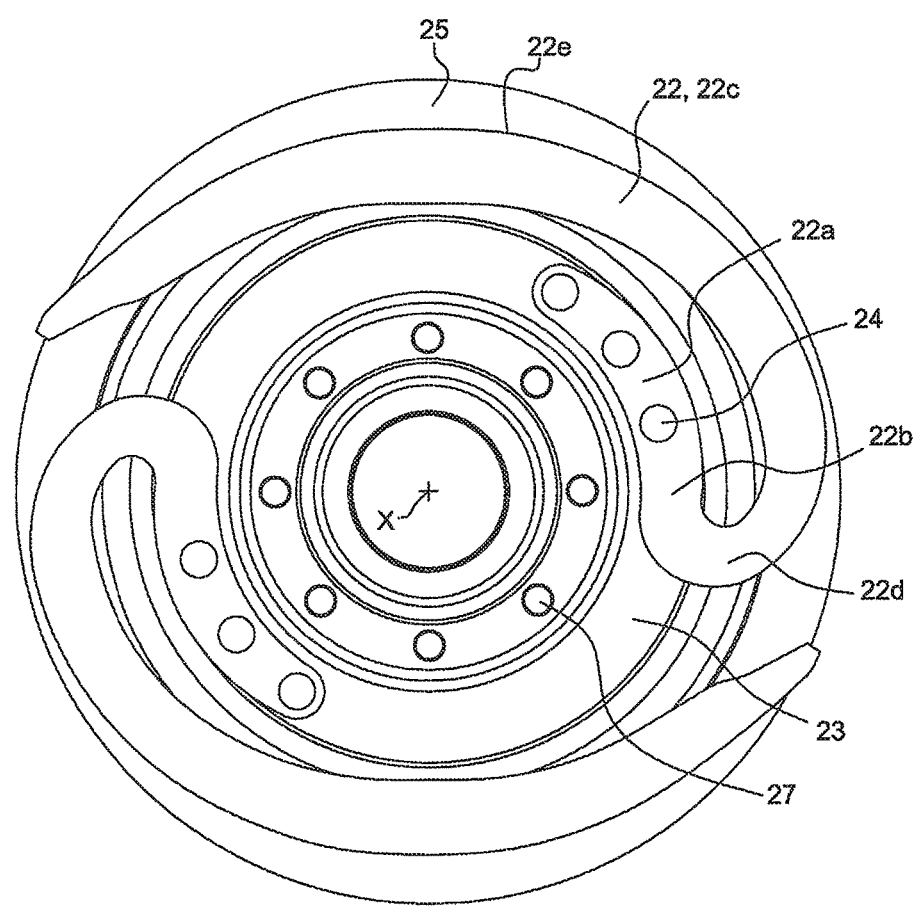
FIG. 3 is a front view illustrating the mounting of the elastic leaves on the piston of the torque converter of FIG. 2.
Figure 4:
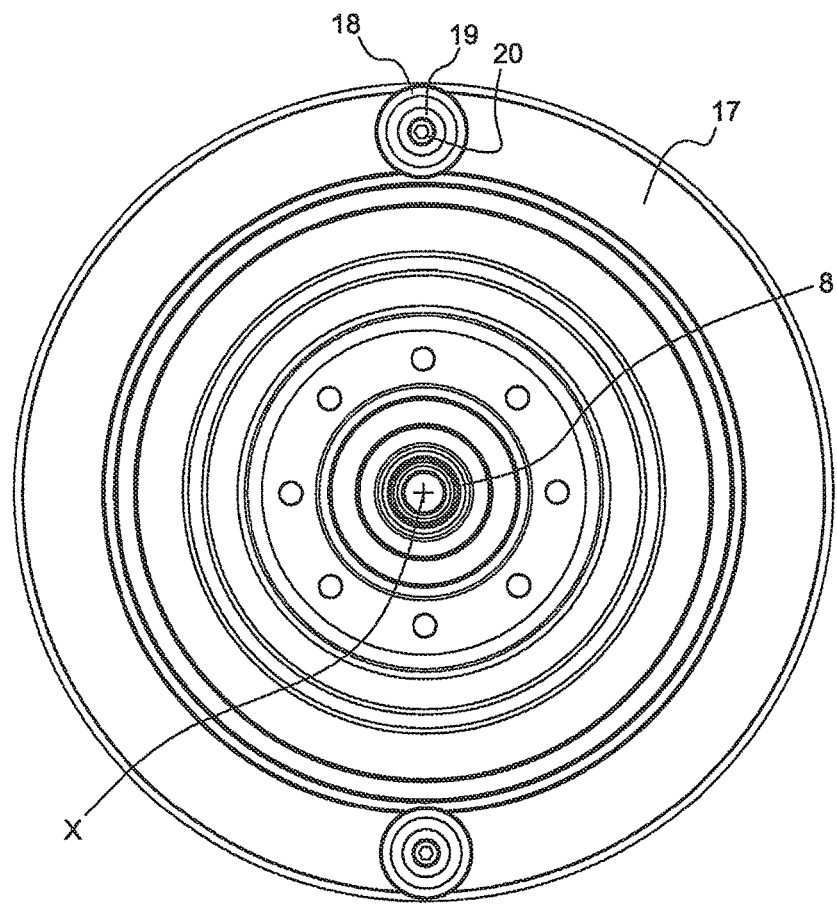
FIG. 4 is a front view showing the mounting of the supporting members on the flange of the torque converter of FIG. 2.

A hydrokinetic torque coupling device according to a first embodiment of the invention is shown in FIGS. 2 to 4. The hydrokinetic torque coupling device is more particularly a hydrodynamic torque converter. Such device makes it possible to transmit a torque from the output shaft of an internal combustion engine in a motor vehicle, such as for instance a crankshaft 1, to a transmission input shaft 2. The axis of the torque converter bears reference X.

In the following, the words "axial" and "radial" are defined relative to the X axis.

The torque converter conventionally comprises an impeller bladed wheel 3, able to hydrokinetically drive a turbine bladed wheel 4 through a reactor 5.

The impeller wheel 3 is fastened (i.e., non-moveably coupled) to a cover consisting of two bell-shaped cover parts 11a, 11b, assembled together by welding and defining an internal volume 12 accommodating the impeller wheel 3, the turbine wheel 4 and the reactor 5. The cover parts 11a, 11b, together referred to as a cover 11, that comprises fastening means 13 making it possible to non-rotatably couple the cover 11 with the crankshaft 1.

The torque converter further comprises a central hub 8, the radially internal periphery of which is ribbed, with an X axis and accommodated in the internal volume 12 of the cover 11. The central hub 8 comprises a first annular rim 14 which extends radially outwards and a second annular rim 15 which extends radially inwards and positioned ahead of the first rim 14.

The turbine wheel 4 is fastened to the first annular rim 14 of the central hub 8, for instance by rivets 16 or by welding. The turbine wheel 4 is also fastened on the radially internal periphery of a flange 17, with said flange 17 being mounted in the internal volume 12. The flange 17 has an annular shape, an axis X and extends radially.

The turbine wheel 4, the flange 17 and/or the central hub 8 may consist of one or more distinct parts without the operation of the torque converter being affected since such parts are fastened together.

Two supporting members or rolling bodies 18 shaped as rollers or cylindrical rollers, are fixed on the radially external periphery of the flange 17. The rolling bodies 18 are positioned so as to be diametrically opposed. The rolling bodies 18 are more specifically mounted about axially extending shafts 19, with said shafts 19 being mounted on the flange 17 using screws 20, bolts or rivets, for instance. The rolling bodies 18 are mounted on the shafts 19 through rolling bearings, such as needle bearings 21, for instance.

The torque converter further comprises two elastic leaves (or blades) 22. As can be seen in FIG. 3, each elastic blade 22 comprises a fastening portion 22a, which is fastened (i.e., non-moveably connected) to an annular linking member 23 by rivets 24, here three in number for each blade 22, and an elastic portion comprising a radially internal strand 22b, a radially external strand 22c, and a bowed or bent portion 22d connecting the internal strand 22b and the external strand 22c. The bowed or bent portion 22d has an angle of approximately 180°. In other words, the elastically deformable portion of the elastic blade 22 comprises two regions radially shifted relative to each other and separated by a radial space. Such blade 22 is for example known from document FR 3 008 152 in the name of the Applicant.

The external strand 22c develops on the circumference with an angle ranging from 120° to 180°. The radially external strand 22c comprises a radially external surface which forms a raceway 22e supported by the corresponding rolling body 18, with said rolling body 18 being positioned radially outside the external strand 22c of the elastic blade 22. The raceway 22e has a globally convex shape. The raceway 22e may directly consist of a zone of the external strand 22c or of a part which is added onto said external strand 22c.

Each external strand 22c is adapted to be axially supported by a radial surface 17a of the flange 17.

Between each elastic blade 22 and the matching rolling body 18, the transmitted torque is broken down into radial stresses and peripheral stresses. Radial stresses make it possible for the matching blade 22 to bend and peripheral stresses make it possible for the matching rolling body 18 to move on the raceway 22e of the blade 22 and to transmit the torque.

The torque converter further comprises clutch means 10 adapted to rotationally couple the cover 11 and the linking member 23 in the engaged position, and adapted to release the cover 11 from the linking member 23 in a disengaged position.

The clutch means 10 comprise an annular piston 25 which extends radially and is accommodated in the inner space 12 of the cover 10, the radially external periphery of which comprises a resting area equipped with clutch lining 26 and adapted to rest on the part 1ib of the cover 11 in an engaged position, so as to provide a rotational coupling of the cover 11 and the piston.

The linking member 23 is fastened to the radially internal periphery of the piston 25, for instance by rivets 27. The linking member 23 and the piston 25 may of course consist of one single part, without the operation of the torque converter being affected.

The elastic leaves 22 and the rolling bodies 18 are such that the elastic leaves 22 may be moved in operation with the piston along the X axis relative to the rolling bodies 18.

The axial motion of the piston 25 is controlled by pressure chambers positioned on either side of the piston 25. Besides, the motion of the piston 25 in the disengaged position may be limited by the radially internal periphery of the piston 25 resting on the second annular rim 15 of the central hub 8.

Such clutch means 10 make it possible to transmit a torque from the crankshaft 1 to the transmission input shaft 2, in a determined operation phase, without any action by the hydrokinetic coupling means consisting of the impeller wheel 3, the turbine wheel 4 and the reactor 5.

In operation, the torque from the crankshaft 1 is transmitted to the cover 11 through the fastening means 13. In the disengaged position of the piston 25, the torque goes through the hydrokinetic coupling means, i.e. the impeller wheel 3 and then the turbine wheel 4 fixed to the hub 8. The torque is then transmitted to the transmission input shaft 2 coupled to the hub through the internal ribs of the hub 8.

In the engaged position of the piston 25, the torque from the cover 11 is transmitted to the linking member 23, then to the flange 17 through a damping device formed by the elastic leaves 22 and by the supporting members 18. The torque is then transmitted to the internal hub 8 whereon the flange 17 is fastened, then to the transmission input shaft 2 coupled to the hub 8 through the internal ribs of said hub 8.

In the engaged position of the piston 25, when the torque transmitted between the cover 11 and the hub 8 varies, the radial stresses exerted between each elastic blade 22 and the matching rolling body 18 vary and the bending of the elastic blade 22 is modified. The modification in the bending of the blade 22 comes with a motion of the rolling body 18 along the matching raceway 22e due to peripheral stresses.

The raceways 22e have profiles so arranged that, when the transmitted torque increases, the rolling bodies 18 each exert a bending stress on the matching elastic blade 22 which causes the free distal end of the elastic blade 22 to move towards the X axis and a relative rotation between the cover 11 and the hub 8 such that the later move away from their relative rest position. Rest position means the relative position of the cover 11 relative to the hub 8, wherein no torque is transmitted between the latter.

The profiles of the raceways are thus such that the rolling bodies 18 exert bending stresses having radial components and circumferential components onto the elastic leaves 22.

The elastic leaves 22 exert, onto the rolling bodies 18, a backmoving force having a circumferential component which tends to rotate the rolling bodies 18 in a reverse direction of rotation and thus to move back the turbine wheel 4 and the hub 8 towards their relative rest position, and a radial component directed outwards which tends to maintain the raceway 22e supported by the matching rolling body 18.

When the cover 11 and the hub 8 are in their rest position, the elastic leaves 22 are preferably radially pre-stressed toward the X axis so as to exert a reaction force directed radially outwards, so as to maintain the leaves 22 supported by the rolling bodies 18.

The profiles of the raceways 22e may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 11 relative to the hub 8 may be greater than 20°, preferably greater than 40°.

The elastic leaves 22 are regularly distributed around the X axis and are symmetrical relative to the X axis so as to ensure the balance of the torque converter.

The torque converter may also comprise friction means so arranged as to exert a resisting torque between the cover 11 and the hub 8 during the relative displacement thereof so as to dissipate the energy stored in the elastic leaves 22.

Figure 5:
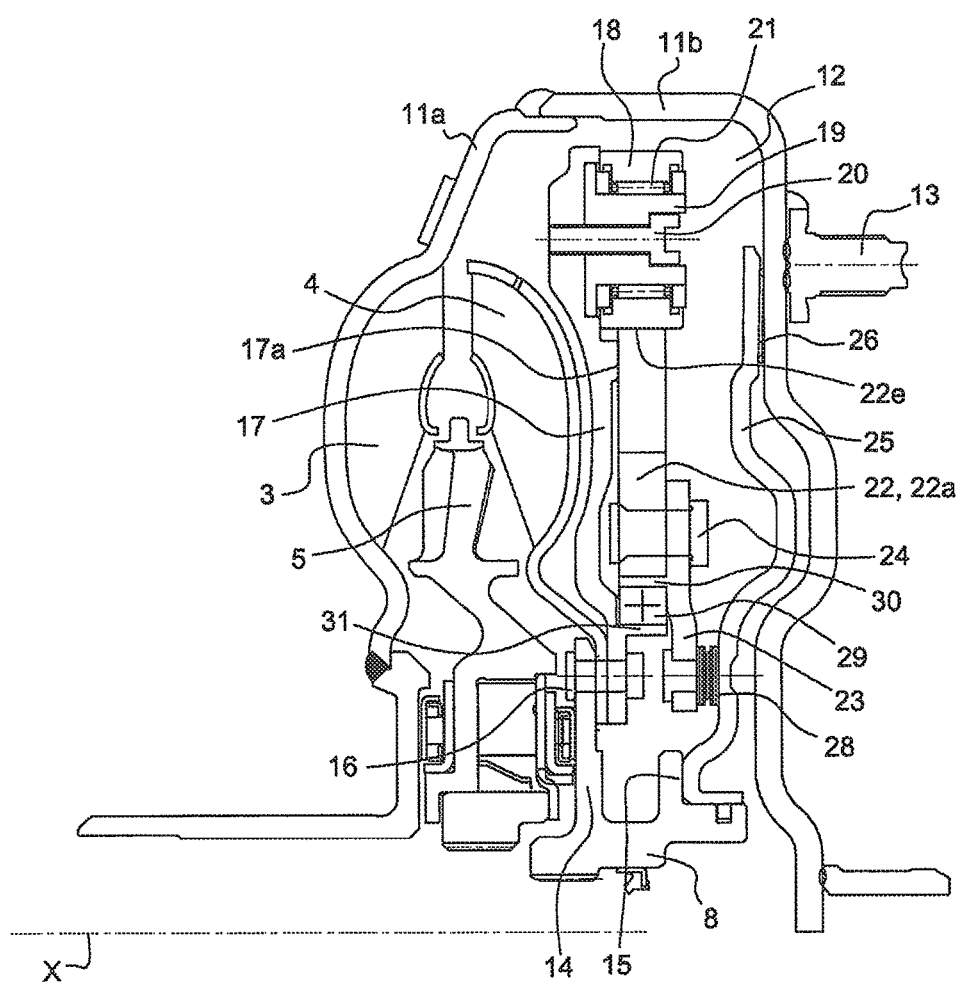
FIG. 5 is a half-view along an axial plane, of a torque converter according to a second embodiment of the invention.

FIG. 5 shows a second embodiment of the invention, which is different from the one shown in FIGS. 2 to 4 in that the piston 25 is connected to the linking member 23 through axially deformable elastic mean, here consisting of elastic lugs 28. The elastic leaves 22 may extend on the periphery and be fastened (i.e., non-moveably coupled) to the piston 25 at one end and to the linking member 23 at the other end, by rivets, for instance.

The piston 25 may then be axially moved between the engaged and disengaged positions thereof, independently of the linking member 23 and the elastic leaves 28 the axial positions of which are substantially stationary during the piston 25 engaging and disengaging phases.

In this embodiment too, the linking member 23 may be so mounted as to pivot on the flange 17, through a rolling bearing, such as a ball bearing 29, for instance. For this purpose, the linking member 23 may comprise a cylindrical rim 30 radially arranged outside a cylindrical rim 31 of the flange 17, with the rolling bearing 29 being radially mounted between the two cylindrical rims 30, 31.

The invention claimed is:

1. A hydrokinetic torque coupling device for a motor vehicle, the hydrokinetic torque coupling device having an axis (X) and comprising:
   a torque input element (11) intended to be coupled to a crankshaft (1);
   a turbine wheel (4);
   an impeller wheel (3) non-rotatably coupled to the torque input element (11) and configured to hydrokinetically drive the turbine wheel (4);
   a damping device (18, 22);
   a torque output element (8) intended to be coupled to a transmission input shaft (2); and
   a clutch (10) configured to rotationally couple the torque input element (11) and the torque output element (8) in an engaged position, through the damping device (18, 22), and to rotationally uncouple the torque input element (11) and the torque output element (8) in a disengaged position;
   the damping device (18, 22) configured to act against the rotation of the torque input element (11) relative to the torque output element (8), in the engaged position of the clutch (10);
   the clutch (10) comprising a piston (25) movable between the engaged position wherein the piston (25) is rotationally coupled to the torque input element (11) and the disengaged position wherein the piston (25) is rotationally uncoupled from the torque input element (11);
   the damping device (18, 22) comprising at least one elastic blade (22) and a supporting member (18), the at least one elastic blade (22) being non-rotatably coupled to the piston (25) or to the torque output element (8) and being elastically supported by the supporting member (18);
   the supporting member (18) being carried by the torque output element (8) or by the piston (25);
   the at least one elastic blade (22) configured to bend upon rotation of the piston (25) relative to the torque output element (8).

2. The hydrokinetic torque coupling device according to claim 1, further comprising an annular flange (17) which radially extends, wherein a radially internal periphery of the annular flange (17) is fastened to the torque output element (8), and wherein the supporting element (18) or the elastic blade (22) is mounted on a radially external periphery of the annular flange (17).

3. The hydrokinetic torque coupling device according to claim 2, wherein the torque output element (8) comprises an annular rim (14) which radially extends outwards, and wherein the flange (17) and the turbine wheel (4) are fastened to the rim (14).

4. The hydrokinetic torque coupling device according to claim 2, wherein the elastic blade (22), or respectively the supporting member (18), is connected to the piston (25) through a linking member (23).

5. The hydrokinetic torque coupling device according to claim 2, wherein the torque output element comprises a central hub (8).

6. The hydrokinetic torque coupling device according to claim 2, wherein the elastic blade (22) is adapted to be moved together with the piston (25) along the axis (X) of the torque converter, relative to the supporting member (18).

7. The hydrokinetic torque coupling device according to claim 1, further comprising a single flange (17) connecting the supporting member (18) or the elastic blade (22) with the torque output element (8).

8. The hydrokinetic torque coupling device according to claim 7, wherein the elastic blade (22), or respectively the supporting member (18), is connected to the piston (25) through a linking member (23).

9. The hydrokinetic torque coupling device according to claim 7, wherein the torque output element comprises a central hub (8).

10. The hydrokinetic torque coupling device according to claim 7, wherein the elastic blade (22) is adapted to be moved together with the piston (25) along the axis (X) of the torque converter, relative to the supporting member (18).

11. The hydrokinetic torque coupling device according to claim 1, wherein the elastic blade (22) or the supporting member (18) is connected to the piston (25) through a linking member (23).

12. The hydrokinetic torque coupling device according to claim 11, wherein the torque output element comprises a central hub (8).

13. The hydrokinetic torque coupling device according to claim 11, wherein the elastic blade (22) is adapted to be moved together with the piston (25) along the axis (X) of the torque converter, relative to the supporting member (18).

14. The hydrokinetic torque coupling device according to claim 1, wherein the torque output element comprises a central hub (8).

15. The hydrokinetic torque coupling device according to claim 14, wherein the elastic blade (22) is adapted to be moved together with the piston (25) along the axis (X) of the torque converter, relative to the supporting member (18).

16. The hydrokinetic torque coupling device according to claim 1, wherein the elastic blade (22) is moveable together with the piston (25) along the axis (X) of the torque coupling device, relative to the supporting member (18).

17. The hydrokinetic torque coupling device according to claim 1, wherein the supporting member comprises a rolling body (18) mounted to pivot about a shaft (19), with the shaft (19) being fastened to the flange (17).

18. The hydrokinetic torque coupling device according to claim 1, further comprising a reactor (5), wherein the impeller wheel (3) is configured to hydrokinetically drive the turbine wheel (4) through the reactor (5).

19. A hydrokinetic torque coupling device for a motor vehicle, the hydrokinetic torque coupling device has an axis (X) and comprising:
- a torque input element (11) intended to be coupled to a crankshaft (1);
- a turbine wheel (4);
- an impeller wheel (3) non-rotatably coupled to the torque input element (11) and configured to hydrokinetically drive the turbine wheel (4);
- a damping device (18, 22);
- a torque output element (8) intended to be coupled to a transmission input shaft (2); and
- a clutch (10) configured to rotationally couple the torque input element (11) and the torque output element (8) in an engaged position, through the damping device (18, 22), and to rotationally uncouple the torque input element (11) and the torque output element (8) in a disengaged position;
- the damping device (18, 22) configured to act against the rotation of the torque input element (11) relative to the torque output element (8), in the engaged position of the clutch means (10);
- the clutch (10) comprising a piston (25) movable between the engaged position wherein the piston (25) is rotationally coupled to the torque input element (11) and the disengaged position wherein the piston (25) is rotationally uncoupled from the torque input element (11);
- the damping device (18, 22) comprising at least one elastic blade (22) and a supporting member (18), the at least one elastic blade (22) being non-rotatably coupled to the piston (25) or to the torque output element (8) and being elastically supported by the supporting member (18);
- the supporting member (18) being carried by the torque output element (8) or by the piston (25);
- the at least one elastic blade (22) configured to bend upon rotation of the piston (25) relative to the torque output element (8);
- the at least one elastic blade (22) or the supporting member (18) linked with the piston (25) through at least one member (28) elastically deformable along the axis (X) of the torque coupling device so as to enable the axial motion of the piston (25) between the engaged and disengaged positions thereof.

20. The hydrokinetic torque coupling device according to claim 19, wherein the elastically deformable member comprises at least one elastic blade (28).

* * * * *